May 5, 1964   C. PERNETTA   3,132,273
BRUSH HOLDER FOR DYNAMOELECTRIC MACHINES
Filed May 29, 1962   2 Sheets-Sheet 1

INVENTOR.
CHARLES PERNETTA
BY
ATTORNEYS

May 5, 1964 C. PERNETTA 3,132,273
BRUSH HOLDER FOR DYNAMOELECTRIC MACHINES
Filed May 29, 1962 2 Sheets-Sheet 2
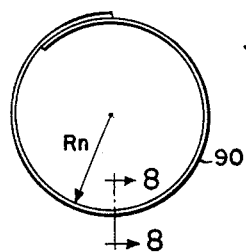
FIG. 7.
FIG. 8.
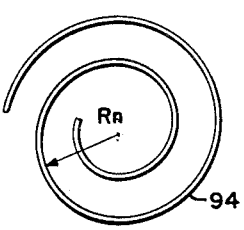
FIG. 9.
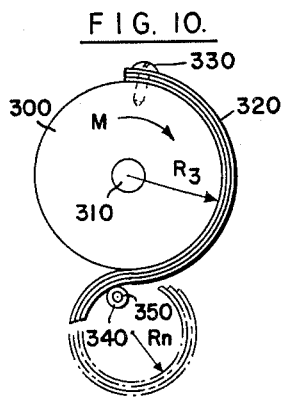
FIG. 10.
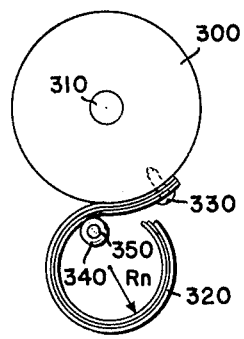
FIG. 11.
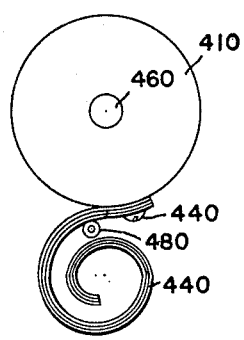
FIG. 12.
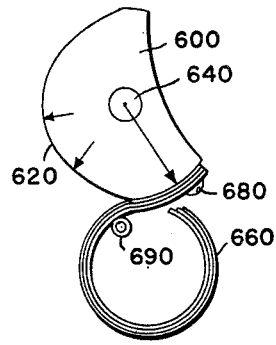
FIG. 13.
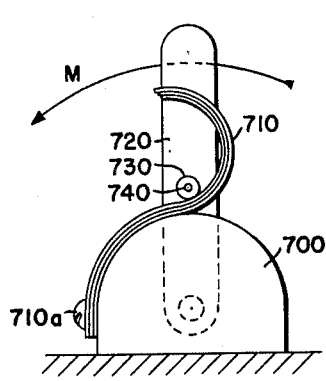
FIG. 14.
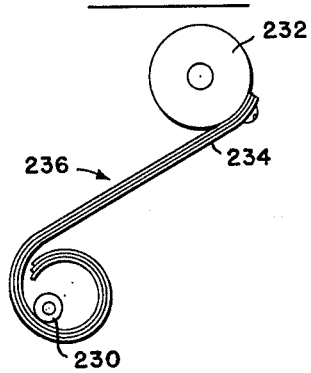
FIG. 15.
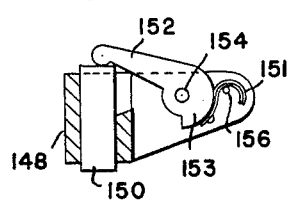
FIG. 16.
INVENTOR.
CHARLES PERNETTA
BY
ATTORNEYS

United States Patent Office 3,132,273
Patented May 5, 1964

3,132,273
BRUSH HOLDER FOR DYNAMOELECTRIC
MACHINES
Charles Pernetta, London, England, assignor to Ametek, Inc., New York, N.Y., a corporation of Delaware
Filed May 29, 1962, Ser. No. 198,579
Claims priority, application Great Britain Feb. 25, 1959
6 Claims. (Cl. 310—246)

The invention relates to a brush holder for dynamoelectric machines.

In accordance with this invention, there is provided a brush holder for a dynamoelectric machine employing a pivoted lever adapted to engage the brush with the lever being biased by a laminated coil spring to urge the brush into contact with the rotatable element with which it co-operates.

In one embodiment of the invention there is provided the combination with an element whereof a linear or substantially linear movement is to be effected or controlled, and a support relatively to which the movement is to be effected or controlled, of a laminated leaf-spring which (a) is disposed in a plane containing the line of movement of said element, (b) has one end anchored on said support and lying in a direction substantially parallel with the line of said movement, (c) extends in a curve to said element, and (d) engages the element for sliding or rolling movement along the spring on the concave side of the spring at a point displaced from the free end thereof, said point of engagement being further from the support than the smallest free radius of the operative portion of the spring between the element and the support, whereby relative movement between the element and support in one sense tends to straighten the spring, accompanied by sliding and rolling movement as aforesaid, and the spring exerts a restoring force tending to move the element in the opposite sense.

Preferably the spring is pre-formed to give a definite load-deflection characteristic, for example, a substantially constant force throughout the range of movement.

However, a spring having a definite but non-constant load-deflection characteristic may be used, for example, the spring may have a spiral form, the least radius of curvature being at the free end of the spring.

The invention will be further clarified by the following description read in conjunction with the accompanying drawings in which:

FIGURE 7 is a side elevation of one form of spring strip used in an alternative embodiment of the invention;

FIGURE 8 is a vertical section on the line 8—8 in FIGURE 7;

FIGURE 9 is a side elevation of another form of spring strip used in an alternative embodiment of the invention;

FIGURE 10 is a side elevation of an alternative form of spring motor for use in a brush holder in accordance with this invention;

FIGURE 11 is a side elevation of the spring motor of FIGURE 10 in a different position;

FIGURE 12 is a side elevation of an alternative embodiment of spring motor for use in a brush holder in accordance with this invention;

FIGURE 13 is a side elevation of an alternative embodiment of a spring motor for use in a brush holder in accordance with this invention;

FIGURE 14 is a side elevation of an alternative embodiment of spring motor for use in a brush holder in accordance with this invention;

FIGURE 15 is a side elevation of another form of spring motor for use in a brush holder of this invention; and FIGURE 16 is a side elevation of a commutator brush embodying this invention.

Figure 1:
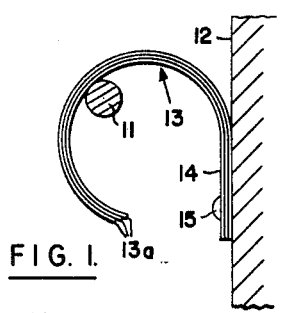
FIGURE 1 is a schematic view illustrating the functioning of a spring employed with this invention.
Figure 2:
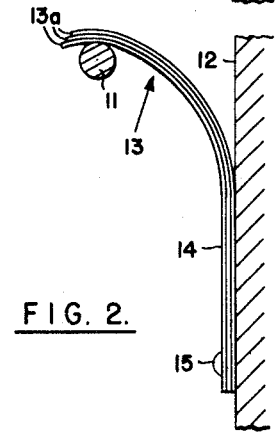
FIGURE 2 is a schematic view of the device of FIGURE 1 showing a different relative position between the parts.

Referring now to the drawings, in FIGURES 1 and 2, a spring control for a peg 11 or the like element movable relatively to a fixed support 12 comprises a laminated leaf spring 13 formed from a plurality of strips 13a, having a substantially circular form but extending through less than 360° when fully relaxed as shown in FIGURE 1, and having one straight end 14 attached to the fixed support 12 by means of a fastening 15. The peg 11, which may be integral with or attached to a movable body (not shown), abuts the concave side of the spring 13 and is slidable along the spring. The peg is spaced from the support by a perpendicular distance which is greater than the radius of curvature of the spring when it is released. Movement of the end 14 causes unwinding deflection of the operative part of the spring 13 between the supports and the peg as shown in FIGURE 2, accompanied by sliding movement of the peg along the spring. The spring 13 then exerts a substantially constant restoring force tending to move the peg 11 downwardly. This restoring force remains substantially constant throughout the movement of the peg 11. The flat surface of support 12 serves to back up the spring as it is unwound.

Figure 3:
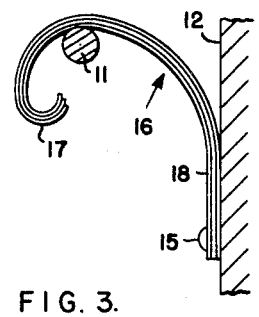
FIGURE 3 is a schematic view of the modification of the device of FIGURE 1.

FIGURE 3 shows a similar arrangement in which a laminated leaf spring 16 has a spiral form, the least radius of curvature of which is at the free end 17 of the spring 16. Movement of the peg 11 upwardly causes deflection of the spring 16 which then exerts a restoring force downwardly on peg 11. This restoring force varies from a maximum when the peg 11 abuts the free end 17 of the spring 16 to a minimum when the spring 16 is substantially fully relaxed.

Figure 4:
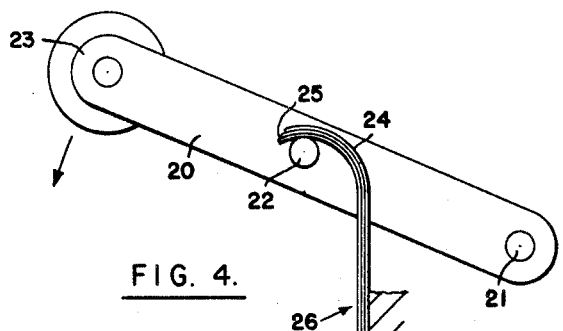
FIGURE 4 is a side elevation of a device illustrating the functioning of a lever employed in the invention.

FIGURE 4 shows the application of a spring control to a lever 20 freely secured at one end on a shaft 21 and provided with a peg 22 between the free end 23 of the lever 20 and the shaft 21. The angular movement of the lever is small so that the peg has a substantially linear movement. The peg 22 abuts the concave side of a laminated leaf spring 24 of spiral form having a free end 25 and a straight portion 26 which is attached to a fixed support by a fastening 27. Movement of the lever 20 and shaft 21 in a clockwise sense unwinds the spring 24 and causes it to exert a resisting force on the lever tending to cause it to rotate in the anticlockwise sense. The restoring force available at the far end 25 of the lever will be less than that of the spring and will vary with the spring force. The torque exerted on the shaft may be substantially constant because although the spring exerts a variable downward force on the lever 20, as already explained with reference to FIGURE 3, as the force decreases (i.e., as the peg abuts the spring further from the free end 25) the moment of the force about the shaft 21 increases and so a substantially uniform torque is produced if a suitable selected spring is used. The characteristic of the spring is, of course, chosen to suit the dimensions of the lever.

Figure 6:
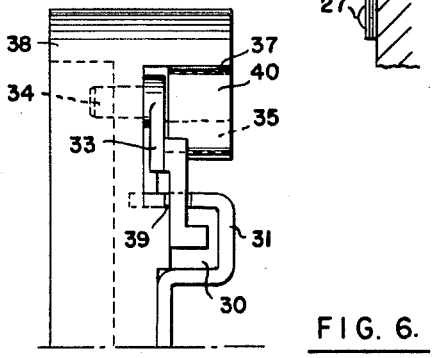
FIGURE 6 is a front elevation of the device of FIGURE 5.
Figure 5:
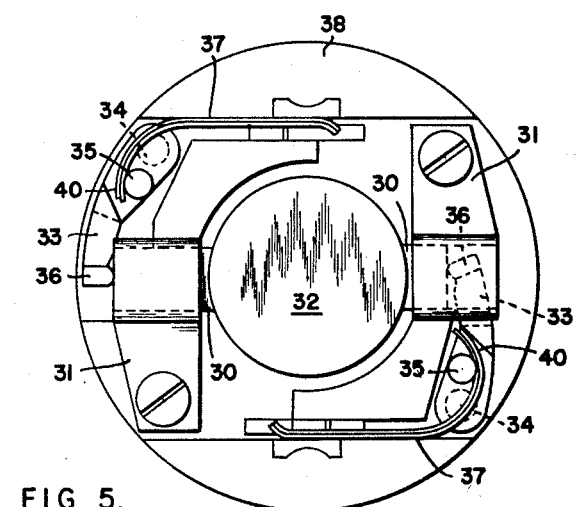
FIGURE 5 is a side elevation of a brush holder of an electric motor in accordance with this invention.

FIGURES 5 and 6 show the incorporation of a spring control similar to that just described to carbon brushes 30 of a miniature electric servomotor in a brush holder in accordance with this invention. Each brush 30 is held in sliding engagement, in a brush holder 31, and is urged towards a commutator 32 by a cranked lever 33 of nylon. Each lever 33 is freely pivoted at one end on a spindle 34 and is provided with a peg 35. The free end 36 of each lever bears on a brush 30. Each lever 33 is urged against the corresponding brush 30 by a laminated leaf spring 40 having a circular form and a straight part 37. The straight part 37 of each spring 40 is anchored to the frame 38 of the motor. Each brush holder 31 is formed with a slot 39 into which the corresponding lever 33 can enter as it urges the corresponding brush 30 towards the commutator 32. The force exerted by each spring on the corresponding lever and consequently the lesser force exerted on the corresponding brush both remain substantially constant as the brushes wear away.

An alternative embodiment of the invention is shown in FIGURE 16. The embodiment of FIGURE 16 employs a modified spring and motor which will be clarified by the following description relating to FIGURES 7 through 15.

In FIGURES 7 and 8 there is shown a single strip 90 of spring material which tends to coil up to a circular form, i.e., the strip has a uniform "set radius" along its length. Such a strip forms a constant force spring strip.

FIGURE 9 shows an alternative form in which a strip 94 of spring material tends to coil up to a spiral form, i.e. the strip has a non-uniform "set radius" along its length.

FIGURE 10 shows one form of a motor comprising a cylindrical member 300 (constituting the aforesaid curved member) rotatably mounted on an axle 310 and having a laminated spring 320, consisting of three strips of the kind shown in FIGURE 7, attached to it by a screw 330. A small guide roller 340 rotatably mounted on an axle 350 bears against the side of the spring remote from the member 300. The roller 340 constitutes the second member as aforesaid and has a diameter substantially less than that of the spring when freely coiled. The roller engages the spring at a distance from the drum which is less than the radius of the spring when free. This location of the roller is adopted in several of the following examples.

The spring 320 is reverse-wound on the member 300 and tends to coil up as shown in FIGURE 11 (which shows the same device). In so doing, the spring will exert a torque and rotate the member 300 between the positions shown in FIGURES 10 and 11.

FIGURE 12 shows a similar form of motor but here a spring 400 consists of several superimposed strips each of the kind shown in FIGURE 9 and tends to coil up as shown into an open spiral form. Spring 400 is secured to drum 410 by a screw 440 and drum 410 is rotatably mounted on axle 460. A small roller 480 bears against spring 400. In so doing it will exert a non-uniform torque with a positive force gradient on the cylindrical member 410. It is within the invention so to rewind the spring of FIGURE 9 that the smaller end of the natural spiral is outermost and to attach this end to the member 410. In this case a non-uniform torque with a negative force gradient will be produced.

FIGURE 13 shows a modified form of the motor according to FIGURES 10 and 11 in which the cylindrical member (310, 410) is replaced by a member 600 having a curved surface 620 of non-uniform curvature and rotatably mounted on axle 640. Laminated spring 660 consists of springs of the kind shown in FIGURE 7 laminated together and secured to member 600 by a screw 680 but it will exert a varying torque on the member 600 as it coils up because of the non-uniform curvature of the surface. A roller 690 bears against spring 660.

FIGURE 14 shows a form of motor in which a fixed member 700, having a semi-cylindrical surface and a spring 710 attached to it by screw 710a, has a lever 720 pivoted on the member. The lever 720 carries a small roller 730 pivotally mounted on an axle 740. The spring 710 consists of strips each of the kind shown in FIGURE 7, and in coiling up, exerts a uniform torque on the lever 720 tending to rotate the lever about its attachment to the member 700.

In the motor shown in FIGURE 15, the roller 230 is spaced so far from rotatably mounted drum 232 that in operation no part of laminated spring 234 (formed from the springs of FIGURE 7) which coils around the roller is subjected to reverse bending around the drum 232. That is to say, only portion 236 of the spring which is set to the same radius as the remainder of the spring which is shown as being held substantially straight due to its connection to drum 232 and contact with roller 230 is wound onto drum 232 during energization of the motor. This feature has the advantage that for a given fatigue life of the spring the diameter of the drum 232 may be reduced, and the free radius of the spring may also be reduced. Alternatively the fatigue life may be increased. In use, that portion of the spring which in its operating cycle passes from its free diameter around the roller 230 to a straightened condition changes from zero stress to a maximum working stress, its working stress range being therefore equal to its maximum stress. The other portion of the strip which, in its operating cycle deflects from the straightened condition to a reverse curvature round the drum 232 is subjected to a still higher maximum working stress but as its working deflection is less than that of the first portion, the working stress range is lower. One portion of the strip therefore has a low maximum working stress with a high stress range whilst the other portion has a high maximum working stress with a low stress range. The motor may be so arranged that the fatigue lives of the two spring portions are approximately equal. If desired, a spring which is preset to two different radii may be used; the larger radius preferably being arranged to operate around the drum.

FIGURE 16 shows a commutator brush 150 of an electrical motor having a brush holder in accordance with the invention incorporating a motor of the type shown in FIGURES 10 and 11. Brush 150 is slidably mounted in housing 148. The necessary force is transferred from the spring 151 passing around roller 156 and which consists of strips of the form shown in FIGURE 7, by a lever 152 integral with a semi-cylindrical disc 153 and pivoted at 154. The motor may be modified to conform to the construction of the previously discussed motors.

It is to be understood that modifications may be made in the above described constructions and it is not desired to be limited except as set forth in the following claims.

This is a continuation-in-part of my co-pending application Serial No. 9,612, filed February 18, 1960, now Patent No. 3,047,280, and a continuation-in-part of my patent application No. 54,892, filed September 9, 1960, now Patent No. 3,047,281.

What is claimed is:

1. A brush holder for a dynamoelectric machine comprising a pivoted lever adapted to engage the free end of a brush, a spring load receiving member secured to the lever, a laminated coil spring with the laminations free for relative movement and lying in one plane, and a support engaging said spring, said spring having one end secured to said support and being supported by said load receiving member for relative movement with respect to the load receiving member with at least a portion of the spring uncoiled and biasing the lever to urge the brush into contact with a rotatable element.

2. A brush holder in accordance with claim 1 in which the load receiving member has a maximum dimension in the plane containing its line of movement substantially less than the free diameter of the spring.

3. A brush holder for a dynamoelectric machine comprising a pivoted lever adapted to engage the free end of a brush and having an arcuate portion, a laminated coil spring with the laminations free for relative movement and lying in one plane, said spring having one end secured to the lever and having a portion backwound against said arcuate portion of the lever to a curvature which is in the reverse sense to that to which the spring is preset, a support engaging the spring and supporting the spring for relative movement with respect to the support with at least a portion of the spring uncoiled and biasing the lever to urge the brush into contact with a rotatable element.

4. A brush holder in accordance with claim 3 in which the laminations are each preset to a substantially constant radius.

5. A brush holder in accordance with claim 3 in which the laminations are each preset to a varying radius.

6. A brush holder for a dynamoelectric machine comprising a pivoted lever adapted to engage the free end of a brush, a laminated coil spring with the laminations free for relative movement and lying in one plane, the laminations of the spring each being preset to a varying radius, a support engaging said spring, said spring having one end secured to one of said lever and said support and supported for relative movement thereto by the other of said lever and said support with at least a portion of the spring uncoiled and biasing the lever to urge the brush into contact with a rotatable element.

References Cited in the file of this patent
UNITED STATES PATENTS

| | | |
|---|---|---|
| 706,286 | Weidaw | Aug. 5, 1902 |
| 967,474 | Williamson | Aug. 16, 1910 |
| 2,602,100 | McDonald | July 1, 1952 |
| 2,802,960 | Baker | Aug. 13, 1957 |